United States Patent

Zelenka

[11] Patent Number: 5,420,714
[45] Date of Patent: May 30, 1995

[54] DEVICE FOR BEAM DIVISION

[75] Inventor: Thomas Zelenka, Mönkeberg, Germany

[73] Assignee: Linotype-Hell AG, Eschborn, Germany

[21] Appl. No.: 50,220

[22] PCT Filed: Jul. 30, 1992

[86] PCT No.: PCT/DE92/00623
§ 371 Date: Apr. 28, 1993
§ 102(e) Date: Apr. 28, 1993

[87] PCT Pub. No.: WO93/05426
PCT Pub. Date: Mar. 18, 1993

[30] Foreign Application Priority Data

Aug. 28, 1991 [DE] Germany .............. 41 28 468.2

[51] Int. Cl.[6] .............. G02B 26/08; G02B 5/30; G02B 1/10; G02B 27/14
[52] U.S. Cl. .............. 359/211; 359/212; 359/484; 359/495; 359/583; 359/629
[58] Field of Search .............. 369/110; 359/211, 212, 359/221, 484, 487, 495, 501, 583, 618, 629; 358/493

[56] References Cited

U.S. PATENT DOCUMENTS

| | | | |
|---|---|---|---|
| 4,272,159 | 6/1981 | Matsumoto | 359/484 |
| 4,406,520 | 9/1983 | Sato | 359/487 |
| 4,429,378 | 1/1984 | Sato | 369/110 |
| 4,595,957 | 7/1986 | Holthusen | 358/290 |
| 4,917,456 | 4/1990 | Jahns et al. | 359/618 |
| 4,936,643 | 6/1990 | Beiser | 359/212 |
| 5,011,245 | 4/1991 | Gibbs | 359/212 |

FOREIGN PATENT DOCUMENTS

| | | | |
|---|---|---|---|
| 0351132A2 | 1/1990 | European Pat. Off. | G02B 27/10 |
| 0354028A1 | 2/1990 | European Pat. Off. | G11B 7/00 |
| 2217175 | 3/1973 | Germany | 359/487 |
| 2403850 | 8/1975 | Germany | G02B 27/10 |
| 2947730C2 | 4/1984 | Germany | G02B 27/10 |
| 3805366A1 | 8/1989 | Germany | H04N 1/028 |
| 3918075 | 10/1990 | Germany | G02B 26/10 |

OTHER PUBLICATIONS

Patent Abstracts of Japan, Publication No. 63-124064, published May 27, 1988, Minzuma Kenichi et al., "Copying Device Used for Both Full Color and Black-and-White".

Primary Examiner—Loha Ben
Assistant Examiner—John Juba, Jr.
Attorney, Agent, or Firm—Hill, Steadman & Simpson

[57] ABSTRACT

A device is provided for division of a light beam into two sub-beams. A polarization beam splitter is provided having a polarizing layer which, dependent upon polarization direction, resolves an incident polarized light beam into a beam component reflected by the polarizing layer as a first sub-beam, and into a beam component transmitted in a direction of an axis of the light beam. The polarization beam splitter is followed along the beam axis by a phase transformer and by a mirror. The phase transformer undertakes a transformation of a linear polarization into circular polarization upon passage of the transmitted beam component therethrough. The resulting circularly polarized beam component is then reflected at the mirror. The phase transformer then produces phase rotation of the polarization by 90° upon passage of the beam component reflected by the mirror. The beam component, which is again incident onto the polarization beam splitter is totally reflected at the polarizing layer to become a second sub-beam.

6 Claims, 2 Drawing Sheets

DEVICE FOR BEAM DIVISION

BACKGROUND OF THE INVENTION

The invention refers to the field of reproduction technology and is directed to a device for dividing a light beam into two sub-beams which comprises a polarization beam splitter having a polarizing layer.

Such a device for beam division can be employed, for example, in a light beam scanner means for originals scanners or for recording devices.

In an originals scanner, also referred to as an input scanner, the light beam is conducted point-by-point and line-by-line across the original to be scanned, and the scan light reflected by the original or allowed to pass by the original is converted into an image signal in an optoelectronic converter. In a recording device, also referred to as a recorder, exposer or output scanner, the light beam is intensity-modulated by an image signal for recording information and is guided point-by-point and line-by-line across a light-sensitive recording medium.

In the case of a flat-bed device, the holder for the original or, for the recording medium, is a planar surface over which the light beam is guided point-by-point and line-by-line and that moves relative to the light beam scanner means.

In the case of an inside drum device, the holder for the original or, the recording medium is designed as a stationary half-shell or trough. The light beam scanner means moves parallel to the longitudinal axis of the half-shell or trough, and the light beam is radially guided over the original or, the recording medium perpendicularly relative to the longitudinal axis.

For example, EP-A-0 354 028, corresponding to U.S. Pat. No. 5,011,245 which discloses an inside drum exposer, discloses a means for beam division. With the device recited therein, it is possible to align the sub-beams such that they have an offset of approximately 180°. Upon rotation of the device in the inside drum, a double beam deflection can be thereby achieved in order to increase the recording speed.

Another device for beam division having a polarization beam splitter wherein a prism is employed as a carrier for the polarizing layer is disclosed by DE-C-39 18 075. The combination of reflection and refraction properties makes it possible to deflect a light beam into a prescribed direction with the assistance of the prism.

EP-B-0 126 469 corresponding to U.S. Pat. No. 4,595,957, discloses that the deflection of light beams over an inside drum be implemented with a rotating mirror. It is possible to illuminate a useful region of 120° with the assistance of the mirror.

Another device for beam deflection in inside drum exposers is disclosed by WO 90/15 355 corresponding to U.S. Pat. No. 4,936,643. In order to avoid the influences of disturbances, two reflection faces are arranged at a rotating shaft here, the one, first reflection face thereof facing toward a radiation source steering the light emission in the direction onto the second reflection face and the latter aligning the light beam onto a material to be exposed.

U.S. Pat. No. 4,878,720 discloses various prism shapes that, however, lead to long running paths of the light beam within the prism and therefore require extremely high-grade and pure glasses in order to avoid deteriorations of the transmission quality.

The known devices do not make it possible to realize a beam splitter such that it is both constructed in a structurally simple way and also guarantees a qualitatively high-grade beam transmission.

SUMMARY OF THE INVENTION

It is therefore an the object of the invention to improve a device of the type initially cited such that a qualitatively high-grade beam division is enabled while guaranteeing a compact arrangement.

According to the invention, a device is provided for division of a light beam into two sub-beams. A polarization beam splitter is provided having a polarizing layer which, dependent on polarization direction, resolves an incident polarized light beam into a beam component reflected by the polarizing layer as a first sub-beam, and into a transmitted beam component in a direction of an axis of the light beam. The polarization beam splitter is followed along the beam axis by a phase transformer and by a mirror. The phase transformer undertakes a transformation of a linear polarization into a circular polarization upon passage of the transmitted beam component therethrough. The resulting circularly polarized beam component is then reflected at the mirror. The phase transformer then produces a phase rotation of the polarization by 90° upon passage of the beam component reflected by the mirror. The beam component, which is again incident onto the polarization beam splitter, is totally reflected at the polarizing layer, said reflected beam component then becoming a second sub-beam.

The invention shall be set forth in greater detail below with reference to FIGS. 1 and 2.

DESCRIPTION OF THE PREFERRED EMBODIMENTS

Figure 1:
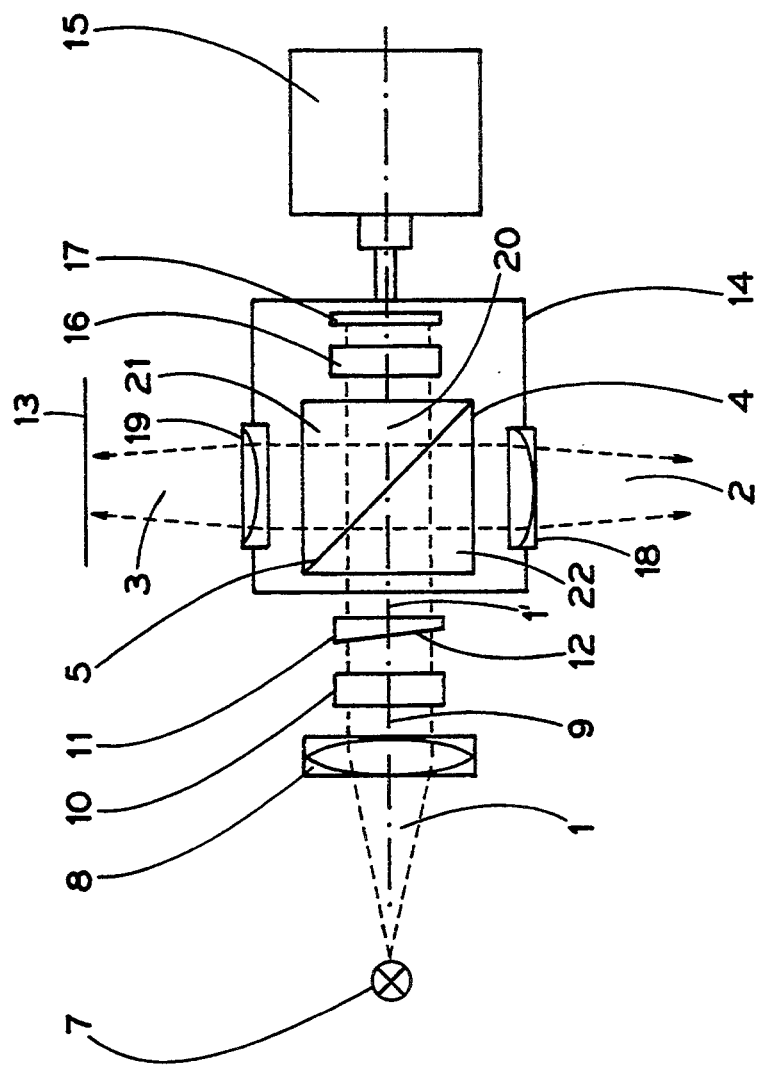
FIG. 1 is an exemplary embodiment of a beam splitter device.

FIG. 1 shows an exemplary embodiment of a beam splitter device wherein a light beam 1 is split into two sub-beams 2, 3 with a polarization beam splitter 4. The polarization beam splitter 4 comprises a polarizing layer 5 by which a polarized light beam is reflected or allowed to pass dependent on the polarization direction.

A light source 7 which, for example, is a semiconductor laser diode, generates the linearly polarized light beam 1. Fundamentally, any other light source that generates a non-polarized light beam can also be employed in combination with a polarizer in order to generate a linearly polarized light beam. The light beam 1 generated by the light source 7 is first supplied to a lens system 8, which focuses the light beam in the direction of a beam axis 9. The focused, linearly polarized light beam 1 is then incident onto a phase transformer 10 wherein the linear polarization is converted into a circular polarization. The phase transformer 10, for example, is a λ/4 plate. The λ/4 plate comprises an anisotropic material or a crystalline structure. The speed of light propagation in crystals is dependent on the orientation of the crystal axes. Different transit times that can be utilized for the transformation of the linear polarization into a circular polarization result therefrom dependent on the orientation of the light components.

Instead of the λ/4 plate, it is also possible to employ differently designed phase transformers. For example, it is possible to employ a magneto-optical converter upon utilization of the Faraday effect, a Fresnel prism or a layer composed of a birefringent material (plastic, liquid crystals, etc.).

In order to avoid complicated, mechanical adjustments, a wedge plate 11 having an entry face 12 inclined relative to the beam axis 9 is arranged following the phase transformer 10. A circularly polarized and adjusted light beam 1' exits therefrom. Given variation of the angle of inclination of the entry face 12 by turning the wedge plate 11, a fine adjustment of the alignment of the sub-beams 2, 3 can be undertaken. In particular, it is possible to design the wedge plate 11 such that the positioning of the sub-beams 2, 3 relative to one another in the region of a projection surface 13 varies only by approximately a few micrometers given rotation of the wedge plate 11 by approximately 10°.

The circularly polarized and adjusted light beam 1' is incident onto a deflection unit 14 rotating around the beam axis 9 in which the light beam 1 is resolved into the sub-beams 2, 3 that proceed radially relative to the beam axis 9 and rotate around the beam axis 9.

The rotation of the deflection unit 14 occurs with a motor 15. In order to achieve good synchronism properties, the deflection unit 14 is preferably seated in air bearings.

The polarization beam splitter 4, a further phase transformer 16, a mirror 17, and lenses 18, 19 are arranged in the deflection unit 14. The phase transformer 16 may comprise an λ/4 plate comprising an anisotropic material or a crystalline material. Polarization beam splitter 4, phase transformer 16, and mirror 17 can be joined to form a compact unit, for example by gluing. Alternatively, the wedge plate 11 can also be a component part of the deflection unit 14 in order to create a compact, mechanical unit whose elements can be suitably adjusted. The mirror 17 could also be stationarily arranged.

A portion of the circularly polarized and adjusted light beam 1' is reflected by the polarizing layer 5 of the polarization beam splitter 4 as a sub-beam 2 that proceeds perpendicular to the beam axis 9. The other portion is allowed to pass through the polarizing layer 5 as a light component 20 proceeding in the direction of the beam axis 9, as a result whereof the light power of the light beam 1 is approximately halved without losses. What is achieved by the circular polarization of the light beam 1 is that the polarization effect of the polarizing layer 5 is independent of the respective rotational angle of deflection unit 14 or of the polarization beam splitter 4. The reflected sub-beam 2 and the light component 20 which is allowed to pass are linearly polarized. The linearly polarized light component 20 is conducted onto the phase transformer 16, which can also be designed as a λ/4 plate. When the linearly polarized light component 20 passes through the phase transformer 16 in the direction toward the mirror 17, the linear polarization is converted into a circular polarization. What is now the circularly polarized light component 20 is reflected at the mirror 17 and again passes through the phase transformer 16 in the opposite direction, as a result whereof a rotation of the polarization by 90° relative to the polarization of the light component 20 running in the direction of the mirror 17 is achieved. As a result thereof, the λ/4 plate has the effect of a λ/2 plate, this leading to the fact that the polarizing layer 5 of the polarization beam splitter 4 has totally reflective properties with respect to the light component reflected by the mirror 17. As a result thereof, the light component 20 coming from the mirror 17 is totally reflected perpendicularly relative to the direction of the beam axis 9 at the polarizing surface 5.

When the polarizing layer 5 is arranged at an angle of approximately 45° relative to the beam axis 9, the two sub-beams 2, 3 emerge from the polarization beam splitter 4 in opposite directions.

As a consequence of the different transit paths of the beam components through the polarization beam splitter 4, the lenses 18, 19 have different optical properties. In particular, it has been envisioned to design in convex fashion the lens 18 and to design in concave fashion the lens 19. Fundamentally, it is also possible to provide only one lens and to undertake the focusing of a sub-beam 2, 3 only with the assistance of the lens system 8. Over and above this, it is also conceivable to design at least one of the lenses 18, 19 as an optical unit together with the polarization beam splitter 4. Finally, it is also conceivable to design the mirror 17 in convex fashion instead of the lenses 18, 19, this focusing the beam path in a suitable way. Further, the polarizing layer 5 can also be given a suitable curvature for focusing. The polarizing layer 5 of the polarization beam splitter 4 is usually designed of a plurality of dielectric layers having different refractive indices. Alternatively, the polarizing layer 5 can be composed of a polarizing film of plastic of some other suitable material. A glass plate or, as in the exemplary embodiment, a prism 4, can be employed as a carrier for the polarizing layer 5. The prism 4 in the exemplary embodiment is composed of two triangular prisms 21, 22. The polarizing layer 5 is arranged in the region of the limiting faces of the triangular prisms 21, 22 which face toward one another. Fundamentally, it is also adequate to employ only one triangular prism.

In the illustrated exemplary embodiment of a device for a beam division, sub-beams 2, 3 offset by 180° due to the rotation of the deflection unit 14 around the beam axis 9 are generated, these rotating around the beam axis 9. When only correspondingly offset, stationary sub-beams are required, the deflection unit 14 can be stationarily arranged. In this case, a light beam 1 to be divided is required that is no longer circularly polarized but need only be linearly polarized with a polarization direction of 45°. In this case, the phase transformer 10 which produces the circular polarization can be eliminated.

Figure 2:
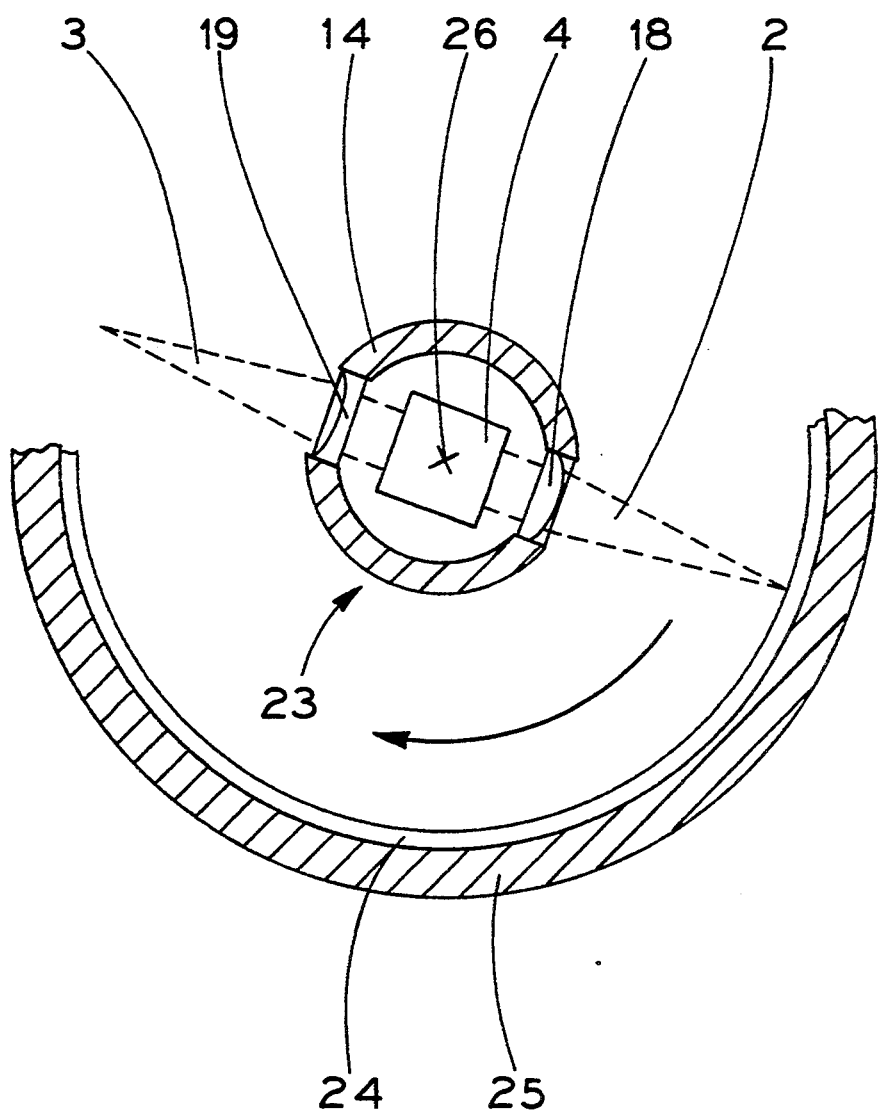
FIG. 2 is an applied example for the beam splitter device.

FIG. 2 shows an applied example of the beam dividing device of the invention in a scanner means 23 of a recording device designed according to the inside drum principle. In such an inside drum recorder or exposer, the recording material 24 is secured to the inside wall of a holder 25 shaped like a half-shell or, cylindrical segment. The scanner means 23 rotates around the longitudinal axis 26 of the half-shell or, of the cylindrical segment. The scanner means 23 comprises the beam splitter device shown and described in FIG. 1. The sub-beams 2, 3 are brightness-modulated by a video signal and are radially deflected across the recording medium 23 for point-by-point and line-by-line recording of information. For that purpose, the scanner means 23 moves along the longitudinal axis 26 on the basis of a suitable drive that is not shown. A higher degree of utilization is achieved on the basis of the two-beam recording.

The device of the invention for beam division can be advantageously employed both in inside drum devices as well as in flat bed devices. It lies within the framework of the invention to also utilize the device of the invention in input scanners. In this case, the sub-beams serve the purpose of point-by-point and line-by-line illumination of the scanned originals.

Although various minor changes and modifications might be proposed by those skilled in the art, it will be understood that I wish to include within the claims of the patent warranted hereon all such changes and modifications as reasonably come within my contribution to the art.

I claim:

1. A device for division of a polarized light beam proceeding along a beam axis into first and second sub-beams, comprising:
    a polarization beam splitter having a polarizing layer for resolving, dependent upon polarization direction, said polarized light beam incident thereon into a beam component reflected by said polarizing layer for forming said first sub-beam, and into a transmitted beam component along a direction of said beam axis, said polarized light beam being incident on a first incident surface of said polarization beam splitter;
    said polarization beam splitter being followed along said beam axis by a phase transformer and by a mirror;
    the phase transformer undertaking a transformation of said transmitted beam component comprising a linearly polarized light beam component into a circularly polarized beam component upon passage of said transmitted beam component therethrough towards said mirror;
    said mirror reflecting said circularly polarized beam component;
    said phase transformer producing a phase rotation of polarization of said beam component reflected by said mirror by 90° upon passage therethrough;
    said polarizing layer of said polarization beam splitter totally reflecting said beam component coming back from the mirror and undergoing said 90° phase rotation by said phase transformer, said totally reflected beam component being employed for said second sub-beam;
    the polarization beam splitter, the phase transformer, and the mirror being arranged for rotation around said beam axis in a fixed allocation to one another so that said first and second sub-beams are rotating; and
    a further phase transformer arranged on said beam axis preceding said first incident surface of said rotating polarization beam splitter for transforming a polarization of said light beam into a circular polarization.

2. A device for division of a polarized light beam proceeding along a beam axis into first and second sub-beams, comprising:
    a polarization beam splitter having a polarizing layer for resolving, dependent upon polarization direction, said polarized light beam incident thereon into a beam component reflected by said polarizing layer for forming said first sub-beam, and into a transmitted beam component along a direction of said beam axis, said polarized light beam being incident on a first incident surface of said polarization beam splitter;
    said polarization beam splitter being followed along said beam axis by a phase transformer and by a mirror;
    the phase transformer undertaking a transformation of said transmitted beam component comprising a linearly polarized light beam component into a circularly polarized beam component upon passage of said transmitted beam component therethrough towards said mirror;
    said mirror reflecting said circularly polarized beam component;
    said phase transformer producing a phase rotation of polarization of said beam component reflected by said mirror by 90° upon passage therethrough;
    said polarizing layer of said polarization beam splitter totally reflecting said beam component coming back from the mirror and undergoing said 90° phase rotation by said phase transformer, said totally reflected beam component being employed for said second sub-beam;
    the polarization beam splitter, the phase transformer, and the mirror being arranged for rotation around said beam axis in a fixed allocation to one another so that said first and second sub-beams are rotating; and
    a further phase transformer being arranged on said beam axis preceding said first incident surface of said polarization beam splitter, and wherein said phase transformer and said further phase transformer comprise $\lambda/4$ plates.

3. A device according to claim 2 wherein the $\lambda/4$ plates comprise an anisotropic material.

4. A device according to claim 2 wherein said, $\lambda/4$ plates comprise a crystalline material.

5. A device for division of a polarized light beam proceeding along a beam axis into first and second sub-beams, comprising:
    a polarization beam splitter having a polarizing layer for resolving, dependent upon polarization direction, said polarized light beam incident thereon into a beam component reflected by said polarizing layer for forming said first sub-beam, and into a transmitted beam component along a direction of said beam axis, said polarized light beam being incident on a first incident surface of said polarization beam splitter;
    said polarization beam splitter being followed along said beam axis by a phase transformer and by a mirror;
    the phase transformer undertaking a transformation of said transmitted beam component comprising a linearly polarized light beam component into a circularly polarized beam component upon passage of said transmitted beam component therethrough towards said mirror;
    said mirror reflecting said circularly polarized beam component;
    said phase transformer producing a phase rotation of polarization of said beam component reflected by said mirror by 90° upon passage therethrough;
    said polarizing layer of said polarization beam splitter totally reflecting said beam component coming back from the mirror and undergoing said 90° phase rotation by said phase transformer, said totally reflected beam component being employed for said second sub-beam;
    the polarization beam splitter, the phase transformer, and the mirror being arranged for rotation around said beam axis in a fixed allocation to one another so that said first and second sub-beams are rotating; and a further phase transformer being arranged on said beam axis preceding said first incident surface of said polarization beam splitter, and wherein at least one of said phase transformer and said further phase transformer comprises a Fresnel prism.

6. A rotatable device for division of a polarized light beam proceeding along a beam axis into rotating first and second sub-beams, said first and second sub-beams including an angle of about 180 degrees, therebetween comprising:

a stationary first phase transformer arranged on said beam axis for converting an incident linearly polarized light beam into a circularly polarized light beam;

a polarization beam splitter arranged on said beam axis behind the stationary first phase transformer, said polarization beam splitter having a polarizing layer for splitting, dependent upon polarizing direction, said circularly polarized light beam coming from the first phase transformer into a linearly polarized first beam component reflected by said polarizing layer propagating perpendicularly to said beam axis and into a linearly polarized second beam component transmitted through said polarizing layer in a direction of said beam axis, said first beam component forming said first sub-beam;

a second phase transformer followed by a mirror arranged on said beam axis;

said second phase transformer converting the linearly polarized second beam component transmitted through the polarizing layer of said polarization beam splitter into a circularly polarized second beam component;

said mirror reflecting the circularly polarized second beam component to said second phase transformer;

said second phase transformer converting the reflected circularly polarized second beam component into a linearly polarized second beam component having a polarization rotated by 90 degrees upon passage through said second phase transformer;

said polarizing layer of said polarization beam splitter totally reflecting the linearly polarized second beam component in a direction inverse to the direction of said first sub-beam so as to form said second sub-beam; and said polarization beam splitter, said second phase transformer, and said mirror being arranged in a unit rotating around said beam axis for generating said rotating first and second sub-beams.

* * * * *